J. N. PARKER.
Hoe.
No. 208,197.  Patented Sept. 17, 1878.
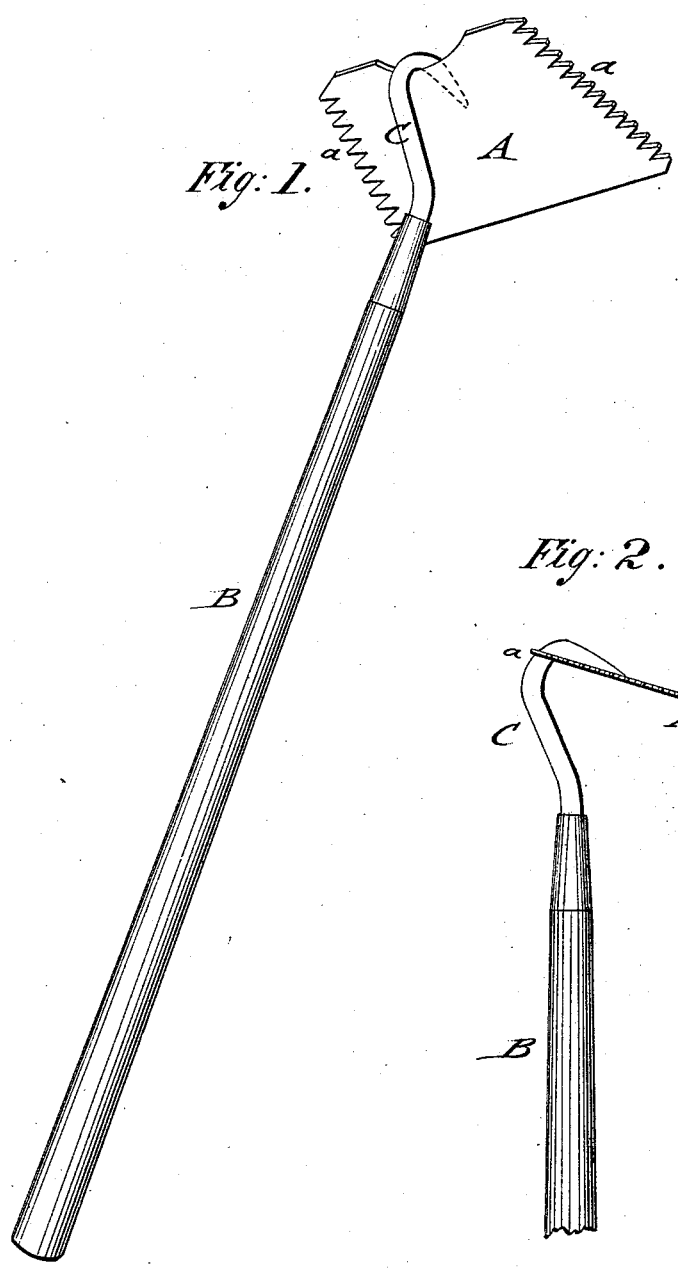
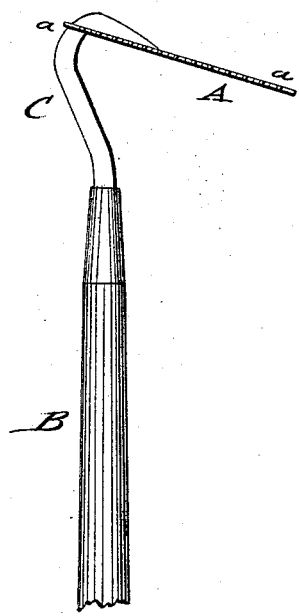

UNITED STATES PATENT OFFICE.

JOSEPH N. PARKER, OF VINELAND, NEW JERSEY, ASSIGNOR TO HIMSELF AND SOLON S. GOULD, OF SAME PLACE.

IMPROVEMENT IN HOES.

Specification forming part of Letters Patent No. 208,197, dated September 17, 1878; application filed August 16, 1878.

*To all whom it may concern:*

Be it known that I, JOSEPH N. PARKER, of Vineland, in the county of Cumberland and State of New Jersey, have invented a new and Improved Hoe, of which the following is a specification:

In the accompanying drawings, Figure 1 represents a perspective view of my improved hoe, and Fig. 2 a side view of the same.

Similar letters of reference indicate corresponding parts.

The object of my invention is to so improve the common field and garden hoe that, with little additional expense, the practical utility and value of the same may be doubled without interfering in the least with the common working of the hoe. By a small addition to the hoe it may be used as a scraper, rake, or cutter for pulling out all large or fine weeds by the roots, or for cutting the weeds on the principle of a mowing-machine knife or sickle, and leaving them on the ground to decay.

The invention consists of a common hoe, the blade of which is provided at both sides with cutting-teeth, to be used as a scraper, rake, or cutter.

Referring to the drawings, A represents the blade of my improved hoe, and B the handle of the same, which is attached centrally to the upper edge of the blade by a connecting-rod, C, that is riveted, bolted, or made solid to the blade, and bent in such a manner as to hold it at the proper angle toward the handle.

The sides of the blade, and for some purposes the upper edge, are cut with wedge-shaped or beveled teeth $a$, that take hold of the weeds and pull them out with the roots, without, however, clogging the teeth, as in the common rake. By holding the blade sidewise, with one of the toothed edges downward, and giving it a reciprocating motion from one side to the other, the teeth cut on the principle of the mowing-machine knife, and clear thereby the ground of weeds. As the blade has teeth at the corners, the hoe may be used for the most difficult work in weeding and hoeing by properly turning it and holding it in the required position and angle to the ground. The scraping off of weeds, the thinning out of surplus shoots of vegetables, the pulling of suckers, and the dragging and removing of other plants can be accomplished without stooping, or without using the fingers, in convenient, quick, and effective manner. The improved hoe combines, therefore, the advantages of a common garden and field hoe with that of a scraping, cutting, raking, and weeding implement, so as to be of increased usefulness for the garden and farm.

Having thus fully described my invention, I claim as new and desire to secure by Letters Patent—

As a new article of manufacture, a combined hoe and rake, consisting of the blade A, having a straight lower cutting-edge and toothed sides $a$, substantially as and for the purpose described.

JOSEPH NEWELL PARKER.

Witnesses:
MILO D. GOULD,
HOWARD WOODWARD.